US011803312B2

(12) United States Patent
Huang

(10) Patent No.: US 11,803,312 B2
(45) Date of Patent: Oct. 31, 2023

(54) DATA STORAGE DEVICE AND SELECTING BAD DATA BLOCK METHOD THEREOF

(71) Applicant: Silicon Motion, Inc., Jhubei (TW)

(72) Inventor: Sheng-Yuan Huang, New Taipei (TW)

(73) Assignee: Silicon Motion, Inc., Jhubei (TW)

( * ) Notice: Subject to any disclaimer, the term of this patent is extended or adjusted under 35 U.S.C. 154(b) by 22 days.

(21) Appl. No.: 17/714,158

(22) Filed: Apr. 6, 2022

(65) Prior Publication Data

US 2023/0139703 A1 May 4, 2023

(30) Foreign Application Priority Data

Nov. 2, 2021 (TW) ................................. 110140659

(51) Int. Cl.
*G06F 3/06* (2006.01)
(52) U.S. Cl.
CPC ............ *G06F 3/064* (2013.01); *G06F 3/0604* (2013.01); *G06F 3/0679* (2013.01)
(58) Field of Classification Search
CPC ...... G06F 3/064; G06F 3/0604; G06F 3/0679; Y02D 10/00
See application file for complete search history.

(56) References Cited

U.S. PATENT DOCUMENTS

| | | | | |
|---|---|---|---|---|
| 9,146,807 B2* | 9/2015 | Yurzola | ................... | G11C 29/52 |
| 9,348,694 B1* | 5/2016 | Nassie | ................... | G11C 29/42 |
| 2010/0122148 A1* | 5/2010 | Flynn | ................... | G11C 16/3422 |
| | | | | 714/E11.034 |
| 2015/0370632 A1* | 12/2015 | Yurzola | ................... | G11C 29/52 |
| | | | | 714/773 |
| 2017/0372797 A1* | 12/2017 | Huang | ................... | G11C 29/42 |
| 2018/0046372 A1* | 2/2018 | Cai | ................... | G11C 16/0483 |
| 2023/0137485 A1* | 5/2023 | Huang | ................... | G06F 3/0619 |
| | | | | 714/764 |

FOREIGN PATENT DOCUMENTS

TW 201810289 A 3/2018

* cited by examiner

*Primary Examiner* — Francisco A Grullon

(57) ABSTRACT

A data storage device and a selecting bad data block method thereof which includes: writing data to a sample block; reading written data of the sample block as read data; comparing the read data and the written data of each data column in sample block, and calculating a number of error bits in each chunk accordingly; selecting a column with the largest number of error bits in a chunk with the largest number of error bits as a bad data column; and recording the sample block as a bad data block when determining that the number of error bits in the chunk is greater than or equal to the first threshold value and the number of bad columns in the chunk is greater than or equal to the second threshold value.

10 Claims, 3 Drawing Sheets

DATA STORAGE DEVICE AND SELECTING BAD DATA BLOCK METHOD THEREOF

FIELD OF THE INVENTION

The present invention relates to an access technique for a data storage device, and more particularly to a selecting bad data block method for the data storage device.

BACKGROUND OF THE INVENTION

The classification of a data storage device is judged based on the quality of the sample data block. In other words, the quality of the sampled data block will affect the statistical feature parameters (such as the average error rate of each data column) of the data storage device, such as deviation. Especially, there is more significantly impact on Downgrade Flash. Therefore, there is a need for a method for selecting bad data block when sampling data block of the data storage device.

SUMMARY OF THE INVENTION

The present invention provides a data storage device and selecting bad data block method thereof, it may remove bad data blocks from sample blocks for avoiding the bad data blocks to induce the deviation of the statistical feature parameters of the data storage device.

The present invention provides a selecting bad data block method, applied to a data storage device, wherein the data storage device comprises a control unit and a data storage medium, and the data storage medium comprises a plurality of data blocks, each data block comprises a plurality of data columns, and the data columns are divided into a plurality of chunks. The control unit is configured to execute the selecting the bad data block method comprising: writing data to a sample block, wherein the sample block selected from a plurality of data blocks; reading written data of the sample block as read data; comparing the read data and the written data of each data column in the sample block, and calculating a number of error bits in each chunk accordingly; selecting a column with the largest number of error bits in a chunk with the largest number of error bits as a bad data column; determining whether the number of error bits in the chunk is greater than or equal to a first threshold value and a number of bad data columns is greater than or equal to a second threshold value; and recording the sample block as a bad data block when determining that the number of error bits in the chunk is greater than or equal to the first threshold value and the number of bad data columns in the chunk is greater than or equal to the second threshold value; wherein, the first threshold value is a number of correctable error bits of error correction code in the data storage device; wherein, the second threshold value is a total number of recordable bad data columns in the data storage device.

The present invention provides a data storage device comprises a data storage medium and a control unit connected to the data storage medium. The data storage medium comprises a plurality of data blocks, wherein each data block comprises a plurality of data columns, and the plurality of data columns are divided into a plurality of chunks. The control unit is configured to execute a selecting bad data column method. The selecting method comprising: writing data to a sample block, wherein the sample block is selected from a plurality of data blocks; reading written data of the sample block as read data; comparing the read data and the written data of each data column in the sample block, and calculating a number of error bits in each chunk accordingly; selecting a column with the largest number of error bits in a chunk with the largest number of error bits as a bad data column; determining whether the number of error bits in the chunk is greater than or equal to a first threshold value and a number of bad data columns is greater than or equal to a second threshold value; and recording the sample block as a bad data block when determining that the number of error bits in the chunk is greater than or equal to the first threshold value and the number of bad data columns in the chunk is greater than or equal to the second threshold value; wherein, the first threshold value is a number of correctable error bits of error correction code in the data storage device; wherein, the second threshold value is a total number of recordable bad data columns in the data storage device.

In one embodiment of the present invention, each of the chunks comprises a data area and a spare area.

In one embodiment of the present invention, each of the data blocks comprises a plurality of data pages, each of the data pages comprises the plurality of data columns which are in the same row.

In one embodiment of the present invention, each of the data pages comprises a data area and a spare area, and the chunks are in the data area.

In one embodiment of the present invention, the first threshold value and the number of the bad data columns are negative correlation.

The present invention provides a data storage device and selecting bad data block method thereof, it may remove bad data blocks from sample blocks for avoiding the bad data blocks to induce the deviation of the statistical feature parameters of the data storage device.

In order to make the above and other objects, features, and advantages of the present invention more comprehensible, embodiments are described below in detail with reference to the accompanying drawings, as follows.

DETAILED DESCRIPTION OF PREFERRED EMBODIMENTS

Figure 1:
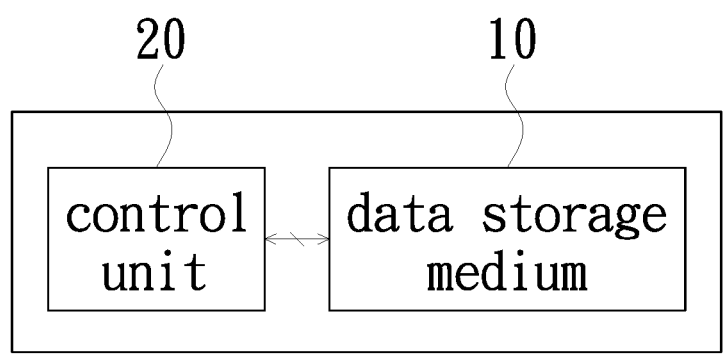
FIG. 1 is a schematic diagram of a data storage device provided by an embodiment of the present invention.

As shown in FIG. 1, FIG. 1 is a schematic diagram of a data storage device provided by an embodiment of the present invention. The data storage device 1 comprises a data storage medium 10 and a control unit 20, and the control unit 20 connected to the data storage medium 10, in order to access data in the data storage medium 10.

Figure 2:
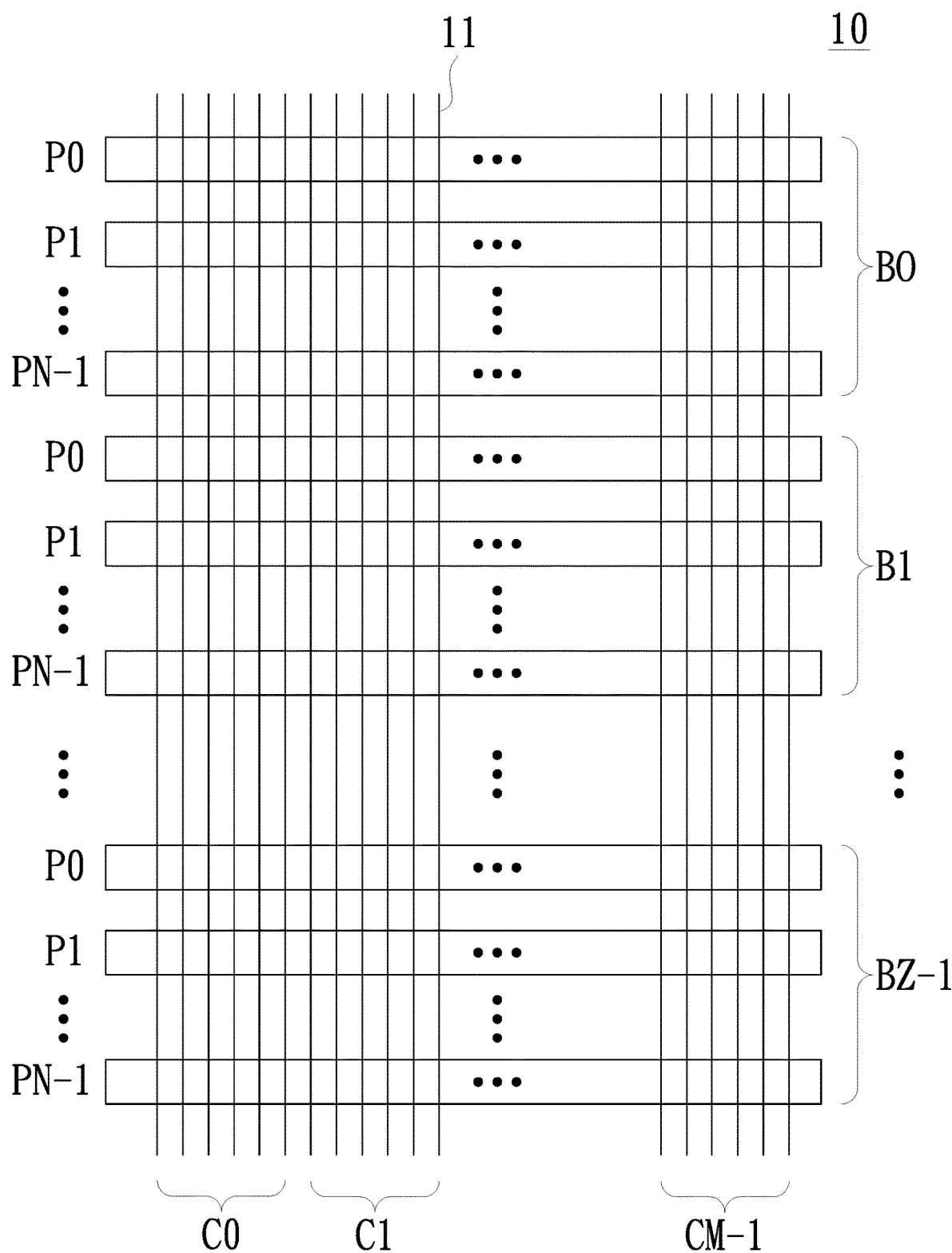
FIG. 2 is a schematic diagram of a data storage medium provided by an embodiment of the present invention.

As shown in FIG. 2, FIG. 2 is a schematic diagram of a data storage medium provided by an embodiment of the present invention. The data storage medium 10 comprises a plurality of data blocks (as shown in the labels B0 to BZ-1). Each data block comprises a plurality of data columns 11, and the data columns placed in the same row is called a data page (as shown in the labels P0 to PZ-1). Further, according to the demand of a user, the data columns 11 are divided into M chunks (as shown in the labels C0 to CM-1), and each chunk C0 to CM-1 comprises a plurality of data columns 11. Z, N, and M in the above are all positive integers. In this embodiment, the data storage medium 10 is realized by non-volatile memory, for example, by a memory device with long-term data storage such as Flash memory, Magnetoresistive RAM, Ferroelectric RAM, etc. Moreover, in one embodiment, each data page can be divided into a data area and a spare area, and the M chunks are in the data area. In the other embodiment, each chunk C0 to CM-1 can be divided into a data area and a spare area. The data area is configured to store data (or user data), the spare area is configured to store parity codes, and the parity codes are configured to correct error bits of data in the data area.

The next thing to explain is, a selecting bad data block method (Hereinafter referred to as the selecting method), may be configured to select a bad data block in sample blocks in the data storage medium 10. Moreover, in this embodiment, one of the data blocks B0 to BZ-1 in the data storage medium 10 is randomly selected as the sample block to perform the selecting method, and not all data block B0 to BZ-1 are used. It should be noted that those skilled in the art can select different number of sample blocks according to the capacity of the data storage medium 10 to perform the selecting method so as to use the selected sample block as a representation of the statistical feature parameters of the data storage device 1, for example, sixteen sample blocks are selected from the data storage medium 10 to perform the selecting method to filter out bad data blocks until the 16 sample blocks are not bad data blocks. Therefore, the present invention does not limit the number of sample blocks. In the other embodiment, the present invention can also perform the selecting method for all data blocks B0 to BZ-1.

Figure 3:
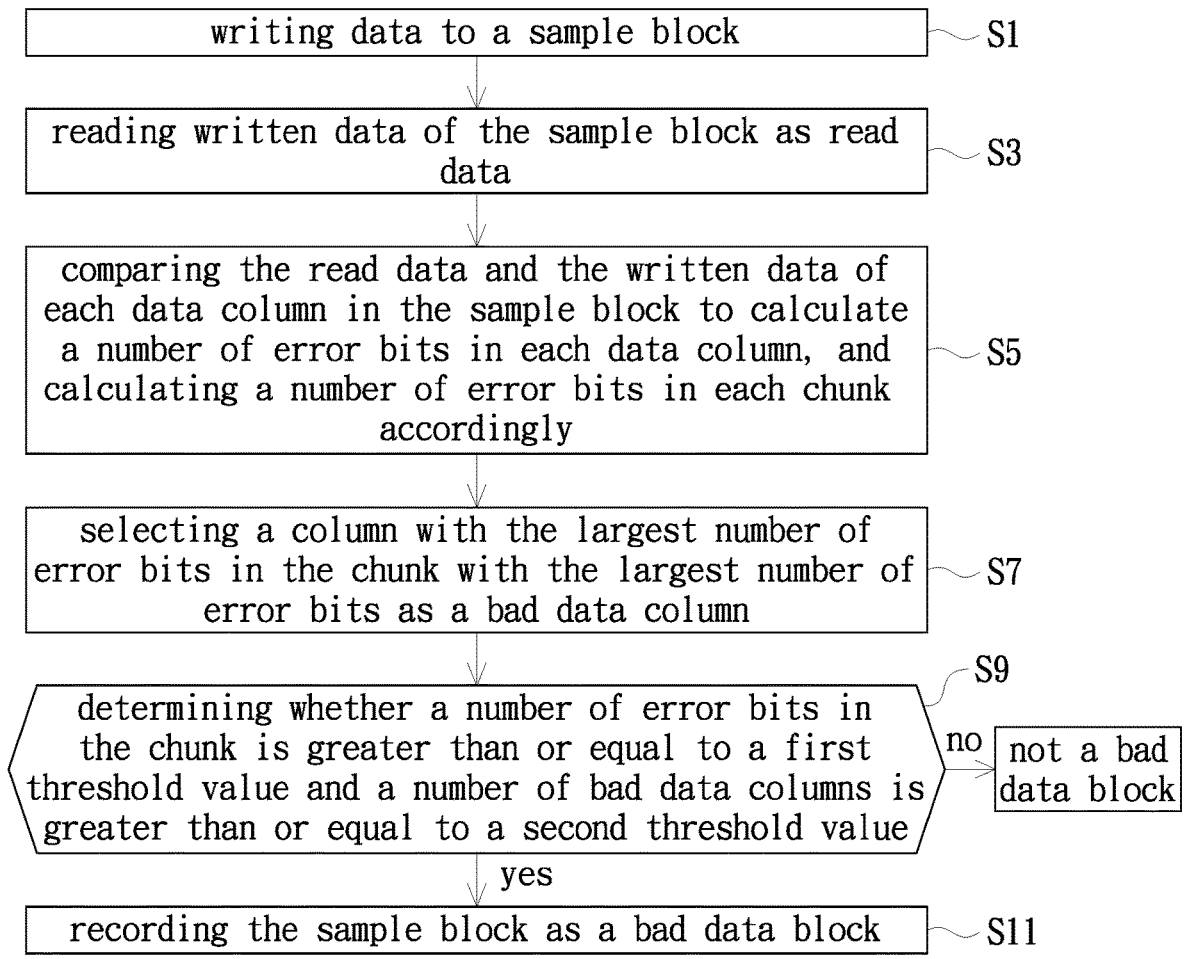
FIG. 3 is a flowchart schematic diagram of a selecting bad data method for a data storage device.

As shown in FIG. 3, FIG. 3 is a flowchart schematic diagram of a selecting bad data method for a data storage device. The control unit 20 is configured to execute the selecting method for bad data column of the present invention including the following steps. In step S1, the control unit 20 writes data to a sample block, wherein the sample block is selected from the data blocks B0 to BZ-1. In step S3, the control unit 20 reads written data of the sample block as read data. In step S5, the control unit 20 compares the read data and the written data of each data column 11 in the sample block to calculate a number of error bits in each data column 11, and calculating a number of error bits in each chunk C0 to CM-1 accordingly. In step S7, the control unit 20 selects a column with the largest number of error bits in a chunk with the largest number of error bits as a bad data column. In step S9, the control unit 20 determines whether the number of error bits in the chunk is greater than or equal to a first threshold value and a number of bad data columns is greater than or equal to a second threshold value, wherein the first threshold value is a number of correctable error bits of error correction code in the data storage device 1, and the second threshold value is a total number of recordable bad data columns in the data storage device 1. In step S11, the control unit 20 records the sample block as a bad data block when determining that the number of error bits in the chunk is greater than or equal to the first threshold value and the number of bad data columns in the chunk is greater than or equal to the second threshold value.

Since the bad data column exists in the data storage medium 10, before the data storage medium 10 is divided into a data area and a spare area, the selecting method for bad data column of the present invention can be used to effectively determine and record the bad data columns of the data storage medium 10. After the locations of the bad data columns are determined, and then the data area and the spare area are divided. In addition, the division of the data area and the spare area are based on a logical division of data management. Therefore, the user can also divide the data area and the spare area in the beginning, and then using the selecting method for the bad data column of the present invention in order to determine and record the locations of the bad data columns. Finally, the division of the data area and the spare area are adjusted. The spirits of the above two data division methods are similar, and the order of execution steps is slightly different, in order to simplify the description of the present invention, only the second embodiment is used for description, but it is not limited thereto.

In one embodiment, the data storage medium 10 includes 17,472 data columns 11, each data column includes 2,560 bits, these data columns are divided into sixteen chunks, each chunk includes 1024 data columns 11, and the spare area includes 17,472−(16*1,024)=1088 data columns 11. That is, each chunk can be allocated to sixty eight data columns 11, so that the error correction code corresponding to the data columns 11 of the spare area provides a 36-bits correction capability for correcting error. The numerical values in this embodiment will change with the capacity of the data storage medium 10, and the present invention is not limited to the above numerical values.

First, the control unit 20 selects a data block (for example, a data block B0) as a sample block and writes data to the sample block, reads written data of the sample block as read data, compares the read data and the written data of each data column 11 in sample block to calculate the number of error bits of each data column 11, and the number of error bits in each chunk in the sample block accordingly in the same time. For example, the data storage medium 10 includes 10 data blocks, each data column 11 of each data block can be allocated 2,560/10=256 bits, and the control unit 20 compares the written data and the read data of each data column 11 including 256 bits to calculate the number of error bits of each data column 11 including 256 bits, and the total number of error bits of each chunk including 1,024 data columns 11.

Then, the control unit 20 selects a chunk with the largest number of error bits (for example, the chunk C0 of the data block B0 has the largest number of error bits which is 1000 error bits), and finds out a first data column 11 with the largest number of error bits (for example, a data column has the largest number of error bits which is ten error bits) in the chunk C0 and records the first data column 11 as a bad data column in a bad data column table of the data storage device 1. It should be noted that the total number of bad data columns recorded in the bad data column table is an upper limit value, that, is the second threshold value, and 1,088 data columns of the spare area in the embodiment, and meanwhile, the correctable error bits of error correction code in the data storage device 1 is the first threshold value, and it represents negative correlation with the number of bad data columns. That is to say, with the number of bad data columns recorded in the bad data column table increases, the first threshold value will gradually decrease, as shown in Table 1.

TABLE 1

| a number of bad data columns | first threshold value | a number of error bits in the chunk with the largest number of error bits | error tolerance |
|---|---|---|---|
| 0 | 36 bits | 1,000 bits | −964 |
| 1 | 35 bits | 990 bits | −955 |
| 2 | 35 bits | 950 bits | −915 |
| 3 | 35 bits | 940 bits | −905 |
| 4 | 35 bits | 930 bits | −895 |

TABLE 1-continued

| a number of bad data columns | first threshold value | a number of error bits in the chunk with the largest number of error bits | error tolerance |
|---|---|---|---|
| 5 | 34 bits | 920 bits | −886 |
| 6 | 34 bits | 900 bits | −866 |
| 7 | 34 bits | 890 bits | −856 |
| 8 | 33 bits | 880 bits | −847 |
| . | . | . | . |
| . | . | . | . |
| . | . | . | . |
| 1088 | 0 bits | 700 bits | −700 |

Then, after recording the first data column 11 as the bad data column in the bad data column table, the control unit 20 finds out a second data column 11 with the largest number of error bits in the chunk C0 and records the second data column 11 as a bad data column in the bad data column table again. And so on, until the number of 1,088 recordable bad data columns of the data storage device 1 is used up.

Finally, the control unit 20 may determine the number of error bits in chunk C0 is larger than or equal to the first threshold value and the number of bad data columns in chunk C0 is larger than or equal to the second threshold value. When the control unit 20 determines the number of error bits in chunk C0 is larger than the first threshold value and the number of bad data columns in chunk C0 is equal to the second threshold value, the control unit 20 records the sample block (that is, the data block B0) as a bad data block, and selects the other data block as the sample block to execute the selecting method. In other words, when the control unit 20 determines the number of error bits in the chunk with the largest number of error bits is less than the first threshold value, it represents that the error tolerance is positive integers in table 1, and the sample block may be regarded as one representation of the statistical feature parameters of the data storage device 1.

In summary, the present invention provides a data storage device and a selecting bad data block method, it can remove the bad data blocks from the sample blocks, thus avoiding the bad data blocks induce the deviation of the statistical feature parameters of the data storage device and as the representation of the statistical feature parameters of the data storage device 1.

Although the present invention has been disclosed as above with the embodiments, it is not intended to limit the present invention. Those ordinarily skilled in the art may make some modifications and retouching without departing from the spirit and scope of the present invention. Therefore, the protection scope of the present invention shall be determined by the scope of the attached claims.

What is claimed is:

1. A selecting bad data block method, applied to a data storage device, wherein the data storage device comprises a control unit and a data storage medium, and the data storage medium comprises a plurality of data blocks, each of the blocks comprises a plurality of data columns, and the data columns are divided into a plurality of chunks, the control unit executes the selecting bad data block method comprising:

writing data to a sample block, wherein the sample block is selected from the plurality of data blocks;
reading written data of the sample block as read data;
comparing the read data and the written data of each data column in the sample block, and calculating a number of error bits in each chunk accordingly;
selecting a column with the largest number of error bits in a chunk with the largest number of error bits as a bad data column;
determining whether the number of error bits in the chunk is greater than or equal to a first threshold value and a number of bad data columns is greater than or equal to a second threshold value; and
recording the sample block as a bad data block when determining that the number of error bits in the chunk is greater than or equal to the first threshold value and the number of bad data columns in the chunk is greater than or equal to the second threshold value;
wherein, the first threshold value is a number of correctable error bits of error correction code in the data storage device;
wherein, the second threshold value is a total number of recordable bad data columns in the data storage device.

2. The selecting bad data block method as claimed in claim 1, wherein each of the chunks comprises a data area and a spare area.

3. The selecting bad data block method as claimed in claim 1, wherein each of the data blocks comprises a plurality of data pages, and each of the data pages comprises the plurality of data columns which are in the same row.

4. The selecting bad data block method as claimed in claim 3, wherein each of the data pages comprises a data area and a spare area, and the chunks are in the data area.

5. The selecting bad data block method as claimed in claim 1, wherein the first threshold value and the number of the bad data columns are negative correlation.

6. A data storage device comprising:

a data storage medium, comprising a plurality of data blocks, wherein each of the blocks comprises a plurality of data columns, and the plurality of data columns are divided into a plurality of chunks; and
a control unit, connected to the data storage medium, and configured to execute a selecting bad data block method, the selecting method comprising:
writing data to a sample block, wherein the sample block is selected from the plurality of data blocks;
reading written data of the sample block as read data;
comparing the read data and the written data of each data column in the sample block, and calculating a number of error bits in each chunk accordingly;
selecting a column with the largest number of error bits in a chunk with the largest number of error bits as a bad data column;
determining whether the number of error bits in the chunk is greater than or equal to a first threshold value and a number of bad data columns is greater than or equal to a second threshold value; and
recording the sample block as a bad data block when determining that the number of error bits in the chunk is greater than or equal to the first threshold value and the number of bad data columns in the chunk is greater than or equal to the second threshold value;
wherein, the first threshold value is a number of correctable error bits of error correction code in the data storage device;
wherein, the second threshold value is a total number of recordable bad data columns in the data storage device.

7. The data storage device as claimed in claim 6, wherein each of the chunks comprises a data area and a spare area.

8. The data storage device as claimed in claim 6, wherein each of the data blocks comprises a plurality of data pages, and each of the data pages comprises the plurality of data columns which are in the same row.

9. The data storage device as claimed in claim 8, wherein each of the data pages comprises a data area and a spare area, and the chunks are in the data area.

10. The data storage device as claimed in claim 6, wherein the first threshold value and the number of the bad data columns are negative correlation.

\* \* \* \* \*